United States Patent [19]

Dudek

[11] 4,310,029

[45] Jan. 12, 1982

[54] EXPANDABLE TUBE PLUG

[76] Inventor: Matthew Dudek, 18 Prospect St., Clark, N.J. 07066

[21] Appl. No.: 28,871

[22] Filed: Apr. 10, 1979

Related U.S. Application Data

[63] Continuation of Ser. No. 881,365, Feb. 27, 1978, abandoned.

[51] Int. Cl.³ .............................................. F16L 55/10
[52] U.S. Cl. ........................................ 138/89; 165/71; 220/235; 215/360
[58] Field of Search ............... 138/89; 85/70; 4/295; 215/360; 220/234, 235; 137/247.47; 165/71

[56] References Cited

U.S. PATENT DOCUMENTS

| | | | |
|---|---|---|---|
| 322,702 | 7/1885 | Ehrlich | 215/360 X |
| 1,146,036 | 7/1915 | Spinks | 215/360 |
| 1,746,369 | 2/1930 | Stern | 220/235 |
| 2,310,351 | 2/1943 | Bowan et al. | 138/89 |
| 2,764,184 | 9/1956 | Fitzhugh et al. | 138/89 |
| 2,923,323 | 2/1960 | Franck | 138/89 |
| 3,032,069 | 5/1962 | Ficklin | 138/89 |
| 3,443,716 | 5/1969 | Evans | 220/235 |
| 3,674,055 | 7/1972 | Ray | 138/89 |
| 3,983,904 | 10/1976 | Laviano | 138/89 |
| 3,993,103 | 11/1976 | Hammer | 138/89 |

FOREIGN PATENT DOCUMENTS

| | | | |
|---|---|---|---|
| 266264 | 10/1963 | Australia | 138/89 |
| 448477 | 5/1948 | Canada | 138/89 |
| 984175 | 7/1951 | France | 215/360 |

*Primary Examiner*—Charles E. Phillips
*Attorney, Agent, or Firm*—Colton & Stone, Inc.

[57] ABSTRACT

An expandable plug for use in effecting a fluid-tight seal at a remote location in a tube includes a compressible sleeve located between a rigid cylindrical member and a rigid sleeve. A bolt extends through the two sleeves and is threaded into the cylindrical member to apply compressive force to the expandable sleeve causing the sleeve to expand radially outwardly into fluid-tight sealing relation with the inner wall of the tube and radially inwardly into fluid-tight sealing relation with the bolt shank thereby protecting the bolt threads from contamination and corrosion. An eccentrically mounted disk is provided at the remote end of the cylindrical member to lock this member against rotation during installation of the plug.

1 Claim, 4 Drawing Figures

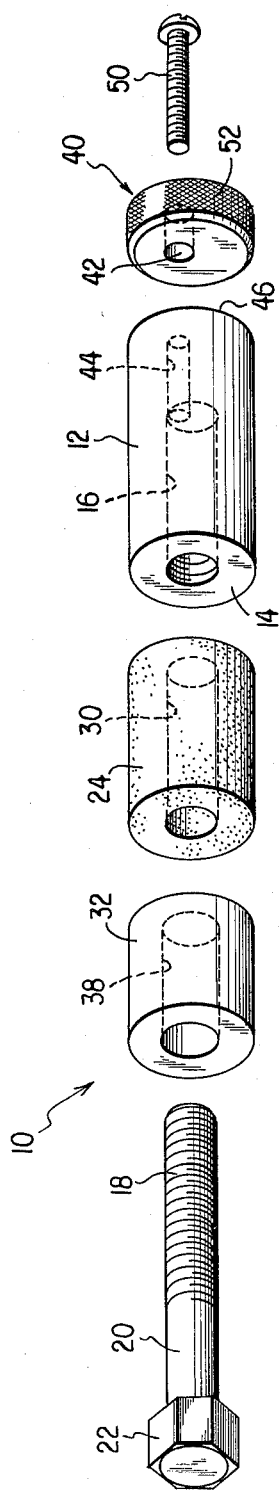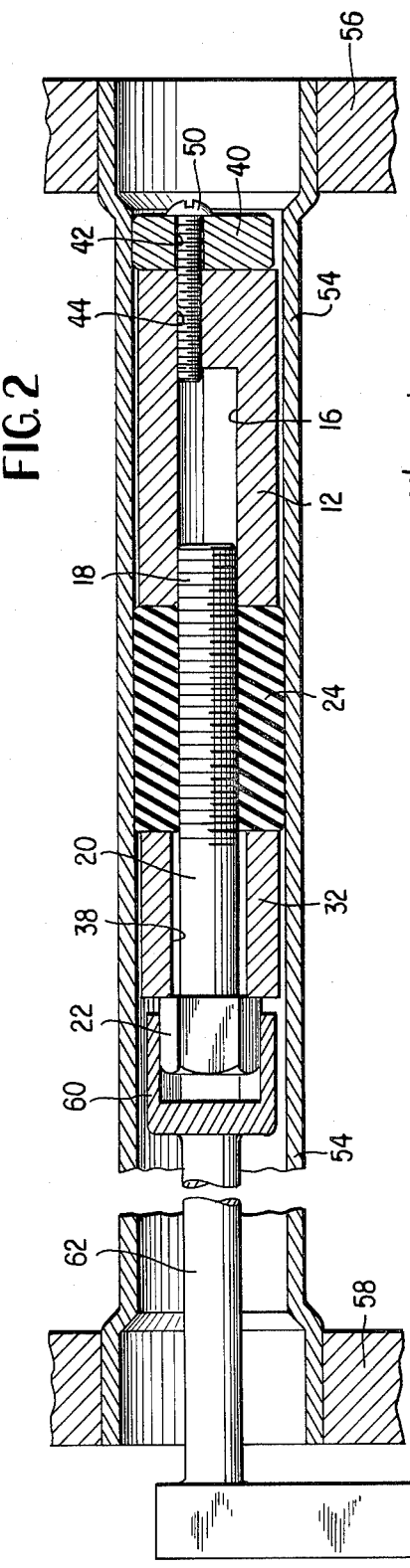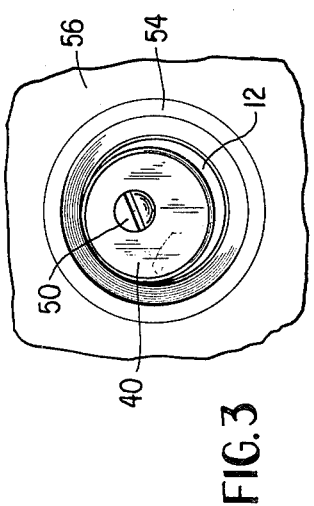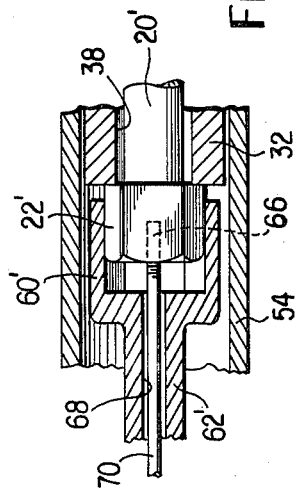

EXPANDABLE TUBE PLUG

This is a continuation of application Ser. No. 881,365, filed Feb. 27, 1978, now abandoned.

The present invention pertains to pipe or tube plugs and, more particularly, to an expanding plug which may be inserted into and expanded from the remote end of a pipe or tube to effect a fluid tight seal.

BACKGROUND OF THE INVENTION

In the operation of a tube and shell type heat exchanger in which a plurality of tubes of substantial length carry a first fluid in heat exchange relation to a second fluid surrounding the tubes, the development of a leak in the side wall of one of the tubes would necessitate the replacement of the heat exchanger unit or of the leaking tube, either of which is a time consuming and expensive procedure, unless the leaking tube is effectively closed off. To accomplish the closing off of a leaking tube, expandable plugs are placed at both ends of this tube, near its junctures with the heat exchanger headers. In order to keep the down time of the unit to a minimum, it is preferable that only one end of the unit be opened to expose the tube ends and the plugs for both ends of the leaking tube are inserted into the tube from the same end. There is difficulty in this procedure, however, that of locating and expanding the plug located at the remote end of the tube.

U.S. Pat. No. 2,764,184, Fitzhugh et al, discloses a plug designed to facilitate the placement and expansion of a plug at a remote location in the tube. The plug of Fitzhugh et al includes an expandable, cylindrical sleeve carried between first and second cylindrical body portions which have a threaded connection. The first body portion carries an eccentrically pivoted, triangular pawl serving to lock this portion against rotation while the second body portion includes a pair of T-shaped slots for engaging a cross pin of an actuating rod. The design of the Fitzhugh et al device, however, leaves the threaded interconnection between the two body portions exposed to the fluid which enters the plugged tube through the sidewall hole. As a result, the threads tend to become corroded, making the plug impossible to remove in a manner which would permit its subsequent reuse.

It is the primary object of the present invention to provide an expandable tube plug which may be inserted into and expanded from the remote end of a tube by the use of a simple socket wrench with suitable extensions and which provides a fluid tight seal not only between the plug and the inner wall of the tube but also around the threads interconnecting the portions of the plug to protect the threads from contamination or corrosion.

It is also an object of the invention to provide a tube plug which is characterized by its simplicity of construction and operation.

BRIEF SUMMARY OF THE INVENTION

The above and other objects of the invention which may become apparent hereinafter are achieved by the provision of a tube plug comprising a first solid cylindrical rigid member portion of an external diameter slightly less than the internal diameter of the tube into which the plug is to be inserted and which as a threaded bore extending axially inwardly from one end thereof; a bolt threadably received in said bore; a tubular sleeve of rubber or other compressible material with an external diameter substantially equal to the diameter of the first body member and an internal diameter slideably receiving said bolt; a second rigid body member of tubular configuration with external and internal diameters substantially equal to those of the sleeve, the sleeve being positioned between the first and second body members whereby, upon the threading of said bolt into the first body member, the compressible sleeve is caused to expand radially outwardly into sealing engagement with the inner wall of the heat exchanger tube and radially inwardly into sealing engagement with the threads of the bolt; and a camming disk located at the remote end of the first body member and freely pivotal about an axis parallel to but offset from the longitudinal axis of the plug and the heat exchanger tube.

BRIEF DESCRIPTION OF THE DRAWINGS

For a more complete understanding of the invention and the objects and advantages thereof, reference should be had to the following detailed description and the accompanying drawing wherein a preferred embodiment of the invention is described and illustrated.

In the drawings:

FIG. 1 is an exploded isometric view of the tube plug of the present invention;

FIG. 2 is a transverse sectional view of the plug of FIG. 1 installed in a heat exchanger tube;

FIG. 3 is a fragmentary elevational view of the remote end of the heat exchanger tube and plug; and FIG. 4 is a fragmentary view similar to that of FIG. 2 but showing a second embodiment of the plug of the present invention.

DETAILED DESCRIPTION OF THE PREFERRED EMBODIMENT

The tube plug, designated generally by the reference numeral 10, includes a first cylindrical member 12 formed of brass or steel and having a diameter slightly less than the internal diameter of the tube in which the plug is used. A blind threaded bore 16 extends axially into the member 12 from one end 14 thereof. A bolt 18, preferably of brass, is threaded into the bore 16. A compressible sleeve 24 and a rigid sleeve 32 are carried on the shank 20 of the bolt 18. Each of these sleeves has an external diameter equal to that of the cylindrical member 12 and an internal through bore 30, 38, respectively, with a diameter slightly greater than that of the bolt shank 20. The compressible sleeve 24 is preferably formed of rubber while the rigid sleeve 32 is brass or steel.

At the remote end 46 of the cylindrical member 12, a second threaded bore 44 is provided, this bore being parallel to but offset from the longitudinal axis of the member 12. A disk 40 having a through hole 42 parallel to but offset from the longitudinal axis of the disk is attached to the member 12 by means of a screw 50 threaded into the bore 44. The disk 40 is only loosely mounted, being free to rotate about the shank of the screw 50 and to wobble to a limited degree about the axis of the screw. Preferably, the disk 40 is formed of steel and has a knurled circumferential surface 52.

Prior to installing the plug 10 in a tube, the bolt 18 is threaded into the bore 16 of the cylindrical member 12 sufficiently to lightly clamp the expandable sleeve 24 between the member 12 and the rigid sleeve 32 without causing radially outward expansion of the expandable sleeve.

Reference should now be had to FIGS. 2 and 3 wherein a plug 10 is shown being installed in the remote end of a heat exchanger tube. The tube, designated by the reference numeral 54 extends between opposite tube sheets 56 and 58. The plug 10, assembled as described in the preceeding paragraph, is inserted into the tube 54 from the end thereof adjacent the tube sheet 58 with a socket wrench 60 engaging the head 22 of the bolt 18. The socket wrench is provided with a shank 62 of sufficient length to reach the remote end of the tube and with a wrench handle 54. When the plug 10 has been moved, without being rotated, to the remote end of the tube, the wrench is now turned so as to thread the bolt 18 further into the bore 16 of the cylindrical member 12. During the initial turning of the wrench, the disk 40 will tend to rotate about the screw 50. Since the screw 50 is offset from the longitudinal axis of the plug 10, the disk will rotate out of concentricity with the cylindrical member 12 with the disk 40 and member 12 wedging against angularly spaced points on the inner wall of the tube 54 thus locking the member 12 against further rotation. With continued rotation of the wrench, the bolt 18 is tightened into the cylindrical member 12 compressing the opposite ends 26 and 28 of the expandable sleeve 24 between the member 12 and the rigid sleeve 32. As a result, the expandable sleeve 24 bulges outwardly into fluid-tight sealing relation with the inner wall of the heat exchanger tube 54 and inwardly to form a fluid-tight seal around the bolt shank 20. This latter sealing action assures that the threaded connection between the bolt 18 and cylindrical member 12 is not exposed to contamination and remains free of corrosion.

When the plug 10 has been tightened sufficiently, the wrench is withdrawn from the tube 54 and a second plug installed at the end of the tube adjacent the tube sheet 58. If, subsequently, it is desired to remove a plug, it is merely necessary to unscrew the bolt 18 from the cylindrical member 12 sufficiently to relieve the compression of the expandable sleeve 24.

FIG. 4 illustrates a modification of the plug of the present invention usable in situations where it is not desirable to rely upon the frictional engagement of the bolt head 22 in the wrench socket 60. In this embodiment, a modified bolt 20' is used, the bolt head 22' having a threaded bore 66 extending axial inwardly. The socket wrench 60' and shank 62' are provided with a through bore 68 receiving a rod 70 having a threaded end engagable in the bore 66. The rod 68 extends beyond the opposite end of the shank 62' and provides a means for controlling movement of the plug axially in a heat exchanger tube.

While a preferred embodiment of the invention has been described in detail herein, it will be understood that the invention is not necessarily limited thereto. Reference should be had to the appended claims in determining the true scope of the invention.

What is claimed is:

1. In a heat exchanger tube plugging system of the type in which a radially expandable plug is inserted, in its unexpanded state, into one end of the heat exchanger tube, moved within the tube to a location adjacent the remote end thereof and, subsequently, rotated by means of a tool engaging the plug and extending outwardly from the one end of the tube to effect expansion of the plug and sealing of the tube, the improved tube plug comprising:

a first metal cylindrical body having a longitudinal axis, first and second ends each perpendicular to the longitudinal axis and a threaded bore extending inwardly from the first end and coaxial with the body, the external diameter of the body being less than the internal diameter of the heat exchanger tube;

a second metal cylindrical body having a longitudinal axis, first and second ends each perpendicular to the longitudinal axis and a through bore coaxial with the body, the external diameter of the second body being less than the internal diameter of the heat exchanger tube, the diameter of the through bore being slightly greater than the diameter of the threaded bore of the first body member;

a compressible cylindrical sleeve having a longitudinal axis, first and second ends each perpendicular to the longitudinal axis and a coaxial through bore, the external diameter of the sleeve in its uncompressed state being less than the internal diameter of the heat exchanger tube, the diameter of the through bore of the sleeve in its uncompressed state being slightly greater than the diameter of the threaded bore of the first body member, the sleeve being positioned between the first and second body members with the axes of the bodies and the sleeve being colinear;

a bolt having a head engageable by the tool and a threaded shank, the shank passing through the bores of the second body member and the sleeve and threading into the bore of the first body member, the head of the bolt bearing against the first end of the second body member;

a metal disc having a knurled circumferential surface and a diameter approximately equal to the external diameter of the first body member; and means mounting the disc on the second end of the first body member for pivotal movement about an axis parallel to but offset from the longitudinal axis of the first body member, the arrangement being such that, upon initial rotation of the bolt when the plug is at the location adjacent the remote end of the tube, the metal disc engages the tube wall locking the first body member against rotation so that with continued rotation of the bolt, the bolt threads into the bore of the first body member to effect compression of the sleeve between the first and second body members forcing expansion of the sleeve outwardly into sealing engagement with the tube wall and inwardly into sealing engagement with the bolt shank preventing fluid movement therealong.

* * * * *